United States Patent [19]

Brown

[11] Patent Number: 4,461,375
[45] Date of Patent: Jul. 24, 1984

[54] ONE-WAY TRANSMISSION SYSTEM FOR BICYCLES OR THE LIKE

[76] Inventor: Lawrence G. Brown, 3285 Old 395 N., Carson City, Nev. 89701

[21] Appl. No.: 824,409

[22] Filed: Aug. 15, 1977

[51] Int. Cl.³ .................. F16D 23/00; F16H 3/44
[52] U.S. Cl. ........................ 192/45; 192/93 A; 192/64; 74/750 B
[58] Field of Search ............... 192/46, 64, 42, 63, 192/104 R; 74/750 B, 217 B, 7 R

[56] References Cited

U.S. PATENT DOCUMENTS

| | | | |
|---|---|---|---|
| 813,465 | 2/1906 | Stevenson | 74/750 B |
| 2,939,562 | 6/1960 | Miller | 74/7 R |
| 2,953,945 | 9/1960 | Gleasman | 74/750 B |
| 3,016,122 | 1/1962 | Miller | 74/74 |
| 3,300,006 | 1/1967 | Digby | 192/63 |
| 3,433,337 | 3/1969 | Salter | 192/46 |
| 3,492,883 | 2/1970 | Maeda | 74/217 B |
| 4,116,319 | 9/1978 | Nagano et al. | 192/64 |

*Primary Examiner*—Samuel Scott
*Attorney, Agent, or Firm*—Bruce G. Klaas

[57] ABSTRACT

A one way rotary force transmission system comprising a rotary force input means for receiving force from operatively associated drive means to impart an angular input velocity thereto; a rotary output means for rotation by said rotary force input means in only one direction to impart an angular output velocity thereto; rotatable force transmission means having at least one transmission member displaceable relative to the rotary force output means between an input force transfer position of direct positive input force transfer between the transmission means and the rotary force output means and a non-force transfer position preventing transfer of force between the rotary output means and the rotary force input means; and transmission actuating means operatively associated with the one transmission member of the transmission means for causing displacement thereof to the input force transmission position in response to applied force causing an angular input velocity greater than the angular output velocity of said rotary output means and to the non-force transfer position in response to reduction in angular input velocity of said rotary force input means below the angular velocity of the rotary output means and being in substantially non-force transfer and in non-load bearing relationship with the rotatable force transmission means and the rotary output means in the input force transfer position.

16 Claims, 7 Drawing Figures

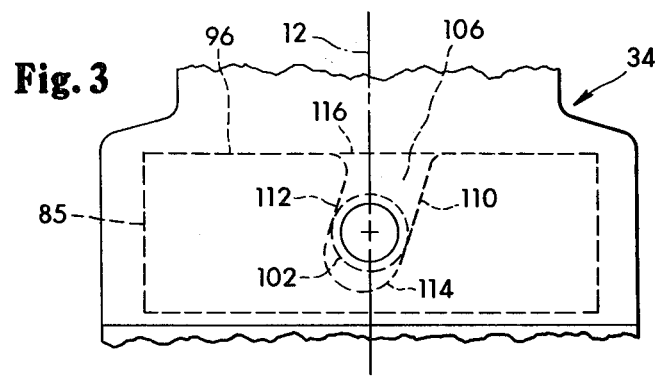
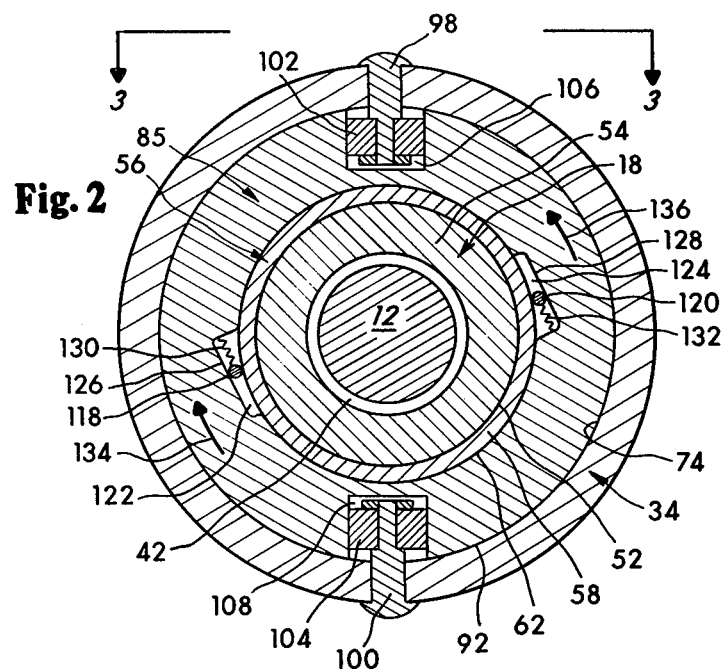
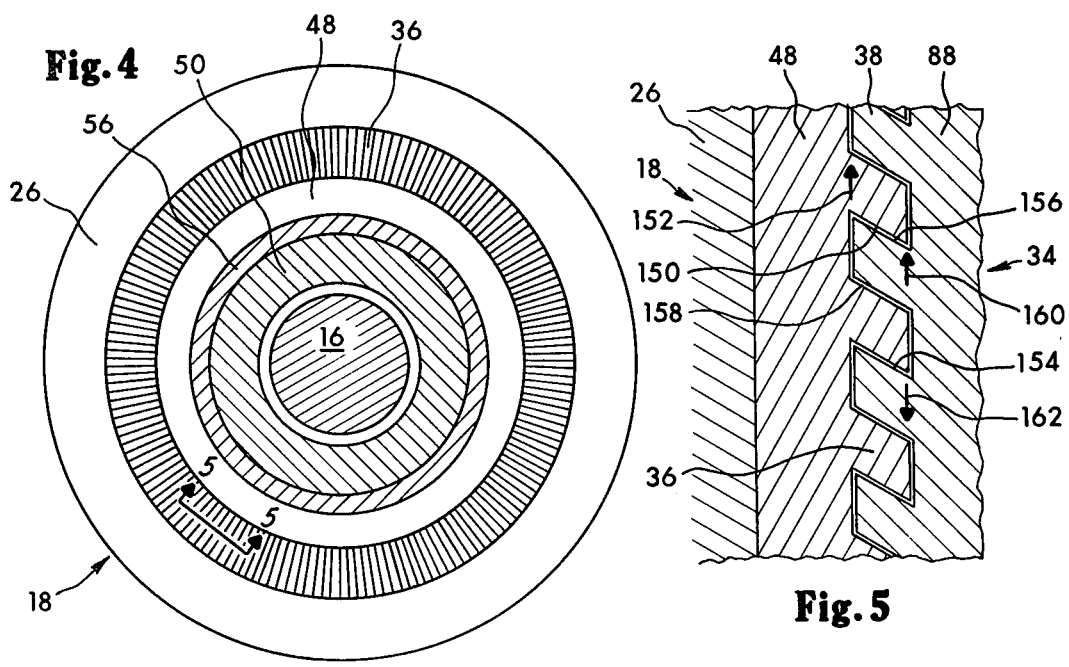

ONE-WAY TRANSMISSION SYSTEM FOR BICYCLES OR THE LIKE

BACKGROUND AND SUMMARY OF THE INVENTION

This invention relates generally to one way motion transmission systems and apparatus and, more particularly, to a one way motion transmission system and apparatus for connecting one or more rotatable input devices, such as one or more chain driven sprocket wheel members, to a rotatable output device such as the rear wheel of a bicycle.

At the present time, there are basically four commercially available one way motion clutch transmission systems including (1) spring loaded ball or roller on ramp type systems, (2) sprag type systems, (3) ratchet type systems, and (4) Torrington type systems. These presently available systems are relatively heavyweight and/or expensive and/or noisy and/or slow acting, and/or limited in load bearing capacity.

The present invention provides a relatively lightweight, low cost, quiet operating and fast acting one-way motion transmission system having high load or torque bearing capacity. While the illustrative embodiments of the invention are herein disclosed in connection with a bicycle drive system, the inventive concepts are applicable to other types of bicycle drive systems and to other drive systems in which the presently available one-way motion systems are commonly used.

The present invention may be usefully employed with conventional bicycle drive systems wherein a chain member is driven by a pedal operated front sprocket wheel and drives one or more rear sprocket wheels operatively connected to the rear wheel of the bicycle.

The present invention is also applicable to a dual drive system of the type comprising a pair of reciprocable drive members, such as chain or cable members, which are drivably connected to the pedals of a bicycle and alternately driven during the alternate power input portions of the pedal movement. Each of the drive members are alternately drivably connected and drivably disconnected relative to the rear wheel to continuously drive the rear wheel in a forward direction while the pedals are being driven by a rider while also being disconnected whenever pedal movement terminates to provide a free wheeling condition for the rear wheel. A bicycle drive system of this type is described in my U.S. Pat. No. 4,133,550 for BICYCLE AND POWER TRANSMISSION SYSTEM, the disclosure of which is incorporated herein by reference.

The inventive concepts are also widely applicable to other kinds of drive systems, other than bicycle drive systems, wherein rotary input motion is utilized to provide one-way rotary output motion.

In general, the inventive concepts may be summarized as comprising a rotary force input means, such as a chain driven sprocket wheel; a rotary force output means, such as a bicycle wheel, to be driven only in one (forward) desired direction by the input means; rotatable force transmission means including at least one transmission element movable between a first force transfer position, directly positively connecting the rotary motion input means to the rotary force output means through the transmission means only upon application of force to the rotary force input means in a direction to cause the one desired direction of movement of the output means, and a second non-force transfer position disconnecting the rotary force input means from the rotary force output means upon termination of the application of force to the rotary force input means in a direction to cause the one direction of movement of the rotary force output means; and transmission actuating means operably associated with the one element of the transmission means for causing movement thereof to the first force transfer position in response to the application of force to the rotary force input means in the direction causing the one direction of movement of the rotary force output means and for causing movement thereof to the second non-force transfer position upon termination of application of force to the rotary force input means in the one desired direction of movement of the rotary force output means, the actuating means being arranged and constructed to have substantially no force transfer nor load bearing relationship with the input means, the output means, or the transmission means in the first force transfer position nor in the second non-force transfer position.

BRIEF DESCRIPTION OF DRAWING

FIG. 2 is an enlarged cross-sectional view of the transmission apparatus of FIG. 1 taken along the line 2—2 in FIG. 1;

FIG. 3 is an enlarged side elevational view of portion of the transmission apparatus of FIGS. 1 and 2;

FIG. 4 is an enlarged cross-sectional view taken along the line 4—4 in FIG. 1 of another portion of the transmission apparatus of FIGS. 1–3;

FIG. 5 is an enlarged cross-sectional view of another portion of the transmission apparatus of FIGS. 1–4 showing tooth means in an engaged position;

DETAILED DESCRIPTION OF THE INVENTION

Figure 1:
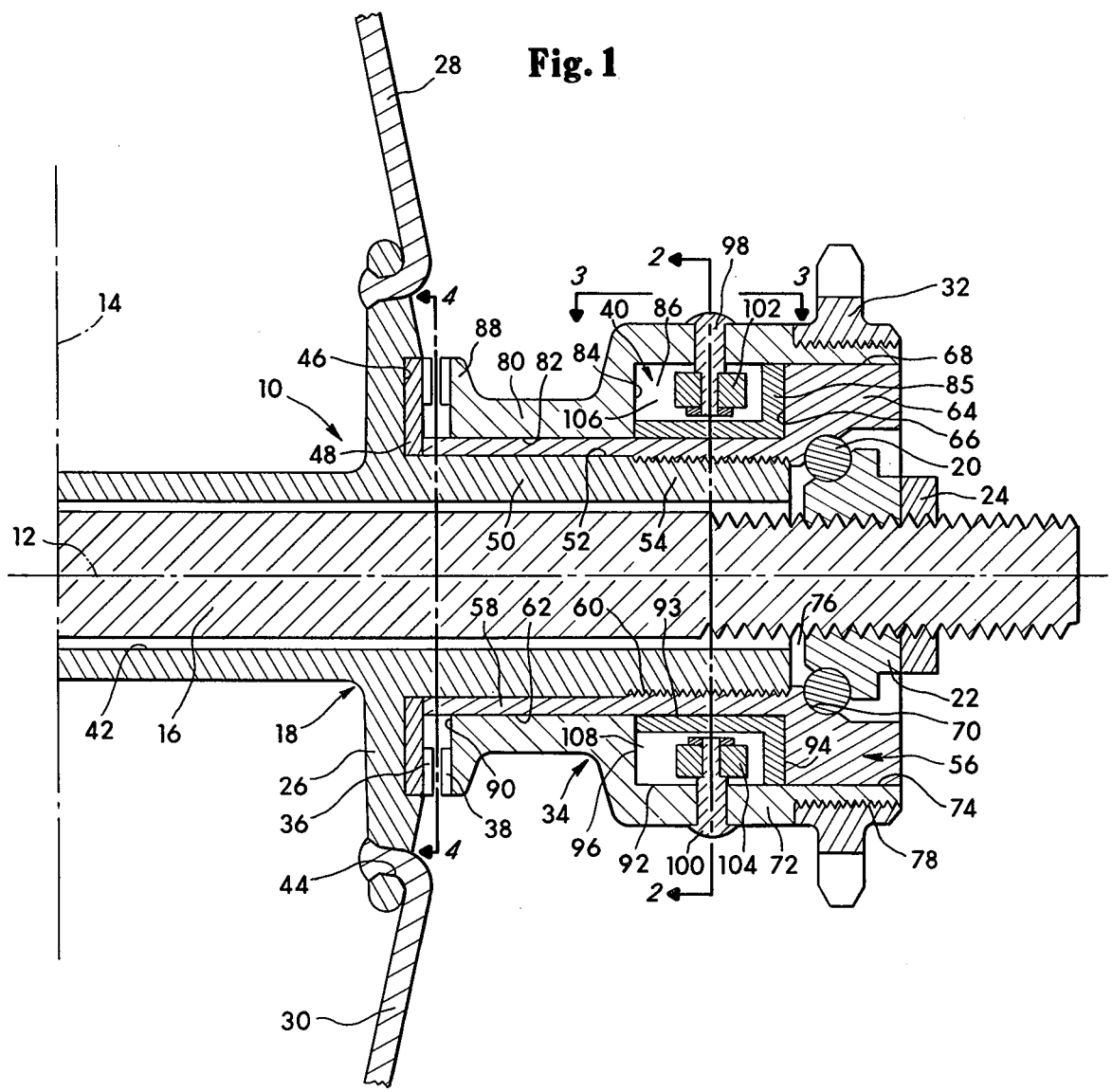
FIG. 1 is a cross-sectional view of a portion of a bicycle wheel assembly showing transmission apparatus of the present invention mounted on one side thereof.

Referring now to FIGS. 1–5. one illustrative embodiment of the present invention is shown in association with rotary force output means in the form of a bicycle wheel assembly 10 adapted to be rotatably driven about a central axis of rotation 12 in a forward direction along a wheel centerline 14 by a bicycle drive system. Only a portion of the wheel assembly 10 sufficient to illustrate the invention is shown in FIG. 1, it being understood that certain portions not shown are conventional or are the same as the portions shown.

In general, the wheel assembly 10 comprises a stationary conventional axle member 16 having opposite threaded end portions, only one of which is shown, adapted to be nonrotatably mounted in a conventional manner in the rear fork of a bicycle frame (not shown). A wheel hub means 18 is freely rotatably mounted on the axle member 16 by conventional bearing means, in the form of axially spaced sets of ball bearing members 20 and bearing support cone members 22, threadably mounted on the opposite end portions of the axle member 16 and secured thereon by lock nuts 24. Spoke attachment flange means, in the form of axially spaced radially extending flange portions 26, integral with hub means 18, support radially outwardly extending spoke members 28, 30.

The transmission means of the present invention, by which the rider generated drive force is applied to the wheel hub means 18, comprises rotary force input means in the illustrative form of a chain driven sprocket wheel member 32. An axially and rotatably movable transmission hub means, in the form of a sleeve member 34, is operatively connected to and rotatable with the sprocket wheel member 32 while being rotatably and axially displaceably mounted relative to the wheel hub means 18, for axial displacement between a non-engaged axially outermost position (FIG. 1) and an engaged rotary force transfer axially innermost force transfer position (FIG. 5) relative to the wheel hub means 18. Force transfer coupling means are provided by mating engageable and disengageable radially extending teeth means 36, 38 on the wheel hub means 18 and the transmission hub means 34, respectively, are provided for transferring rotary force from the transmission hub means 34 to the wheel hub means 18 only in a forward direction. Transmission actuating means 40 are provided for causing axial inward displacement of the transmission hub means 34 to the engaged axially inwardmost force transfer position in response only to the application of forward movement drive force on sprocket wheel 32 while causing axial outward displacement of the sleeve member to the disengaged non-force transfer position upon termination of the application of the forward movement drive force on the sprocket wheel 32 and/or reduction of wheel angular velocity relative to sprocket 32. It is to be understood that the aforedescribed transmission and clutch apparatus may be used with any bicycle drive system including a conventional single drive chain system having one rear sprocket wheel or multiple rear sprocket wheels 32 on only one side of the rear wheel assembly 10 and also including a dual drive chain system having rear sprocket wheels 32 on both sides of the rear wheel assembly 10 as described in my U.S. Pat. No. 4,133,550.

In the illustrative embodiment of FIGS. 1-5, the wheel hub means 18 is made of one piece of any suitable material such as aluminum alloy or steel having a central axial bore 42 in which axle 16 is mounted. The integral annular flange portion 26 has spoke mounting holes 44. An annular axially outwardly facing slot 46 fixedly receives an annular hardened steel plate 48 on which the tooth means 36 are provided. An axially outermost portion 50 of the wheel hub may be of enlarged diameter for strength and provides a cylindrical outer peripheral surface 52 having a threaded end portion 54. A bearing sleeve member 56 made of relatively hard machined steel has an annular elongated portion 58 mounted on and fixedly attached to the wheel hub portion 50 by threads 60 to provide a cylindrical outer peripheral bearing surface 62. An annular end flange portion 64 provides a radially outwardly extending abutment surface 66, an annular outer bearing surface 68, and an inner bearing race groove 70 for receiving the ball bearing members 20. If desired, the plate 48 with the tooth means 36 and/or the bearing sleeve member 56 may be integrally formed on the hub means 18 rather than being made as separate parts.

The transmission hub means 34 comprises a one piece sleeve member having a first axially outermost enlarged annular portion 72 of maximum diameter having an annular inner peripheral surface 74 defining an annular cavity 76. The axially outermost portion of the inner peripheral surface 74 is rotatably supported on the outer peripheral surface 68 of bearing sleeve 56 or on interposed bearing sleeve means (not shown). The axially outermost portion of the outer peripheral surface is provided with threads 78 to threadably attach the sprocket wheel member 32. A second axially innermost annular portion 80 of reduced diameter provides an annular inner peripheral bearing surface 82 which may be rotatably supported on annular portion 58 of the bearing sleeve member 56 or an interposed bearing sleeve (not shown). A radially outwardly extending abutment surface 84 connects surface 82 to surface 74 so as to define an annular slot means 86 between surfaces 62, 66, 74 and 84. A radially outwardly extending annular flange portion 88 is provided on the axially innermost end portion with the tooth means 38 provided on the end surface 90 thereof. Thus, the transmission hub member 34, as well as the sprocket wheel 32 and the tooth means 38 connected thereto, are rotatable and axially slidable relative to the wheel hub means 18.

The transmission actuating means 40 comprises an annular ring member 85 having a cross-sectional shape generally corresponding to the cross-sectional shape of the slot means 86 with an annular outer peripheral surface 92 circumjacent the inner annular peripheral surface 74, an annular inner peripheral surface 93 circumjacent the outer annular peripheral surface 62, an axially outermost radially extending side surface 94 next adjacent radial surface 66, and an axially innermost surface 96 next adjacent radial surface 84. A plurality of radially extending pin members 98, 100 are used to operatively connect the ring member 85 to the transmission hub means 34 through support roller members 102, 104 mounted in axially inclined cam grooves 106, 108 in the ring member 85. As shown in FIG. 3, each of the grooves 106, 108 is inclined relative to the central axis 12 with parallel side surfaces 110, 112 being connected by a rounded end surface 114 and intersecting side surface 96 to provide an axially inwardly facing opening 116. Conventional one-way clutch devices, FIG. 2, are provided between the ring member 85 and the bearing member 56 and may be in the form of a plurality of ball members 118, 120 mounted in grooves 122, 124 in the inner peripheral surface 93 of ring member 85 on inclined ramp surfaces 126, 128 with compression spring members 130, 132 outwardly biasing the ball members toward engagement with the outer peripheral surface 62 of sleeve member 56. Thus, rotation of the ring member 85 relative to the bearing member 56 in the forward direction of arrow 134 causes the ball members to be grippingly engaged between surfaces 126, 128 and surface 62 to restrain the ring member 85 against axial and rotative movement relative to the bearing member 56 while rotation of ring member 85 in the opposite direction of arrow 136 forces the ball members inwardly along the ramp surfaces against the compression spring members to enable relative rotation and relative axial displacement between ring member 85 and bearing sleeve 56. Any other kind of one-way clutch drive, such as sprag elements, a ratchet, a roller-sprag ramp, a friction cup, etc. may be used to lock the ring 85.

The construction and arrangement is such that when forward movement rotary forces are applied to the sprocket wheel 32, the forward rotary movement of the transmission sleeve member 34 and the ring member 85 in the direction of arrow 134 cause immediate gripping engagement of the ball members 118, 120 between the ring member 85 and the bearing sleeve 56 resulting in immediate axial inward displacement of the transmission hub means 34 caused by the cam action of the roller members 102, 104 with the inclined side surfaces 110, 112 of the cam grooves 106, 108. In this manner, the tooth surfaces are quickly positively engaged and the rotary movement of the transmission hub means 34 causes corresponding rotary movement of the wheel hub means 18. The bearing sleeve member 56, which is affixed to the wheel hub member, and the ring member 85, which is drivably connected to the transmission hub member by the pin members 98, 100 rotate with the transmission hub means 34 and the wheel hub means 18 without being part of the transmission elements by which force is transferred and without having any load bearing function involving the transfer of rotary force to the wheel hub means 18. As soon as the application of drive force to the sprocket wheel through the drive chain is terminated, and/or the rotational velocity of wheel hub means 18 is greater than that of the drive sprocket 32, the ring member 85 will be released relative to the bearing sleeve member 56 to enable relative rotation between the transmission hub sleeve member 34 and ring member 85 causing axial outward displacement of the transmission hub sleeve member 34 and disengagement of the tooth surfaces 36, 38 as a result of coaction of the roller members 102, 104 in the cam grooves 106, 108. If necessary or desirable, spring means (not shown) may be mounted between the ring member 85 or the bearing sleeve member 56 and the transmission hub member 34 to bias the transmission hub member 34 toward the engaged position while also enabling resilient relative displacement during tooth engagement and assisting the axial disengagement thereof. It is to be noted that the ring member 85 and the one-way clutch devices are operative by and subject to only relatively light loads while not being subject to the relatively heavier loads transmitted between the drive sprocket wheel 32 and the wheel hub means 18 solely through the tooth surfaces 36, 38 and the transmission hub member 34 when the teeth are engaged. Thus, the transmission actuating means can be of more simple and less expensive construction with greater durability and longer life in use. Furthermore, the transmission system is much faster and more quiet in operation than conventional one-way transmission systems while providing positive direct drive between the sprocket wheel member 32 and the wheel hub means 18.

Referring now to FIGS. 4 and 5, the tooth means 36, 38, have an illustrative annular ring gear form and preferably have self engaging and disengaging tooth profiles. As shown in FIG. 5, the teeth 36 have an inclined rotary force transfer surface 150, facing away from the direction of forward movement rotary force transfer as indicated by arrow 152 and an inclined separating force transfer surface 154 facing the direction of forward movement. The teeth 38 have an inclined force transfer surface 156 facing the direction of forward movement and an inclined separating force surface 158 facing away from the direction of forward movement. Thus, forward rotary movement of the teeth 38 in the direction of arrow 160 causes self-engagement and forward rotary movement of teeth 36 in the direction of arrow 152. Any relative rotary force in the opposite direction of arrow 162 causes self-disengagement by axial displacement of teeth 38 relative to teeth 36 because of the cam action of the inclined surfaces 154, 158.

Figure 6:
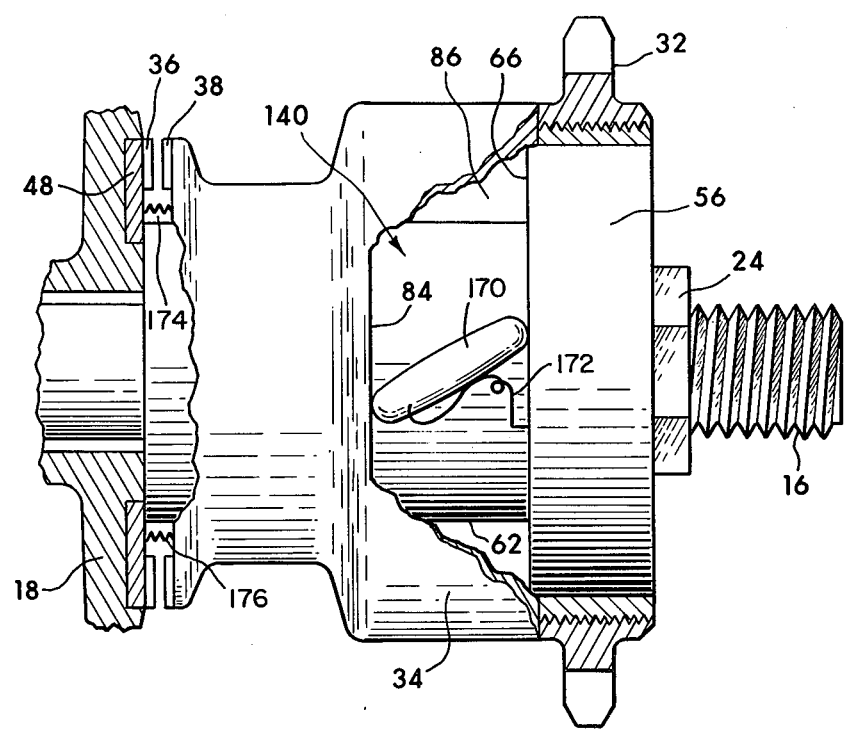
FIG. 6 is cross-sectional view of a portion of an alternative embodiment of transmission apparatus of the present invention.

Referring now to FIG. 6, a modified form of the transmission actuating means 140 of the invention of FIGS. 1–5 is shown to comprise a plurality, preferably three, of equal circumferentially spaced conventional sprag type one-way clutch elements 170 having associated spring members 172 mounted in annular slot 86 between surfaces 66, 84 in place of the ring member 85, the pins 98, rollers 102, 104, and grooves 196, 108. In addition, spring means 174, 176 are mounted between plate 48 and radial surface 90 of the transmission hub means 34 to bias the transmission hub means 34 toward the axial outward non-transfer position whereat tooth means 36, 38 are disengaged. Thus, rotation of the sprocket wheel 32 and the transmission hub means 34 in the forward movement direction will cause the sprag elements 170 to be moved relative to surfaces 66, 84 to a position of lesser inclination relative to the central axis resulting in axial inward displacement of the transmission hub means 34 against the bias of springs 174, 176 to engage the teeth means 36, 38. Whenever the angular velocity of the transmission hub means 34 is less than the angular velocity of the wheel hub means 18, such as during termination of application of forward movement force or application of reverse movement force on sprocket wheel 32, the transmission hub means 34 is axially outwardly displaced to disengage the teeth means 36, 38 as the sprag elements 170 are moved relative to surfaces 66, 84 to a position of greater inclination relative thereto.

While the embodiments of the invention of FIGS. 1–6 employ axially engageable radially extending teeth means, other types of engageable and disengageable teeth means may be employed such as external and internal ring gear and spline members and conical gear members or the like which are engageable and disengageable by relative axial and/or radial displacement. In addition, while the embodiments of FIGS. 1–6 employ a transmission hub means which is axially movable relative to the wheel hub means, other arrangements providing relative axial movement for the purpose of engaging and disengaging the teeth means may be employed, such as keyed or splined sleeve arrangements permitting axial displacement of the teeth means 36 relative to the wheel hub means 18.

Figure 7:
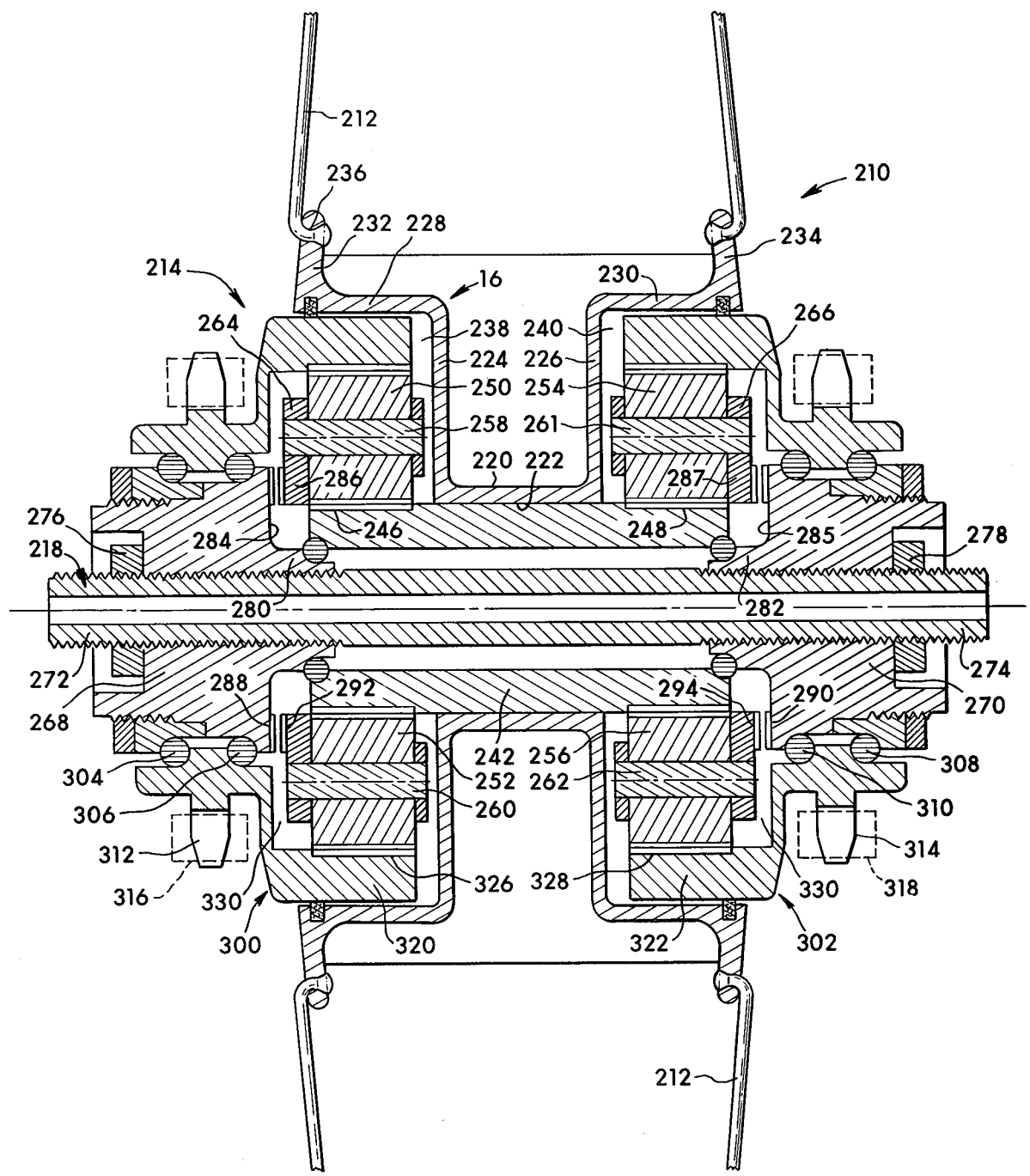
FIG. 7 is a cross-sectional view of a portion of a bicycle wheel assembly showing of another alternative embodiment of transmission apparatus of the present invention.

Referring now to FIG. 7, another illustrative embodiment of the invention is shown in association with a rear bicycle wheel assembly 210 comprising spoke members 212 mounted between a rear hub and axle assembly 214 and a tire rim (not shown). The hub and axle assembly 214 comprises a wheel hub member 216 mounted circumjacent a stationary axle member 218 by which the rear wheel is fixedly mounted on a bicycle frame (not shown) in a conventional manner. The hub member 216 comprises a central annular portion 220, having a cylindrical central bore 222, a pair of radially outwardly extending annular flange portions 224, 226, a pair of axially extending annular flange portions 228, 230, and a pair of radially extending annular rim portions 232, 234 having spoke mounting openings 236. The flange portions 224, 228, and 226, 230, respectively, define annular cavities 238, 240.

Sun gear means, in the form of a cylindrical sleeve member 242, is mounted in bore 222 circumjacent axle member 218 and suitably fixedly drivably connected to the annular portion 220. Opposite pitch helical gear teeth means 246, 248 are provided on opposite ends of the sleeve member 242 outwardly of bore 222. A suitable and equal number of planetary gear members 250, 252 and 254, 256 with suitable corresponding helical gear teeth are mounted on and in engagement with the helical gear teeth means 246, 248. The planetary gear members 250, 252 and 254, 256 are rotatably supported on shaft members 258, 260 and 261, 262 which are mounted on annular carrier ring members 264, 266.

A pair of end members 268, 270 are threadably mounted on threaded end portions 272, 274 of the axle member 218 and held thereon by threaded lock nuts 276, 278, the end members 268, 270 having axially inner ball bearing end portions 280, 282 for rotatably supporting the sleeve member 242 and the wheel hub member 216. The end members 268, 270 also have radially extending surfaces 284, 285 which extend radially outwardly beyond and overlap the radially innermost portions 286, 287 of ring members 264, 266. The overlapping portions of surfaces 284, 285 and surfaces 286, 287 are provided with engageable and disengageable radially extending toothed surfaces 288, 290 and 292, 294, which may be of the type shown in FIG. 5, to provide planetary gear holding means for causing transmission of force to the sun gear means.

A pair of transmission hub members 300, 302 are rotatably mounted on the end members 268, 270 by suitable ball bearing means 304, 306 and 308, 310. The hub members 300, 302 comprise axially outermost annular sprocket wheel portions 312, 314 adapted to receive and engage drive chain members 316, 318 of a dual drive system of the type disclosed in my U.S. Pat. No. 4,133,550. The hub members 300, 302 further comprise axially innermost internal ring gear portions 320, 322, having helical gear teeth 326, 328 of opposite pitch, which are engaged with the planetary gear members 250, 252, 254, 256.

In operation, the chain members 316, 318 are alternately effective to cause alternate forward rotation of the transmission hub members 300, 302 during a 360° rotary movement of the crank arms and pedals (not shown) of a dual bicycle drive system of the type disclosed in my U.S. Pat. No. 4,133,550. During forward movement of each chain member, the associated one of the transmission hub members 300, 302 is rotated in a forward movement direction. When the teeth 288 and 292 and 294 are disengaged, the planetary gear members and support ring members 264, 266 revolve relative to the sun gear means and the ring means without transmitting force therebetween. The initial forward rotation of each transmission hub member 28, 30 causes the associated planetary gear members 250, 252 or 254, 256 to be rotated and axially outwardly displaced by the coaction of the helical gear teeth on the internal ring gear portion and on the planetary gear members. The axial movement of the planetary gear members causes axial outward displacement of the annular ring members 264 or 266 and engagement of the teeth 288 and 292 or 290 and 294. When engagement of the teeth is effected, the support ring members 264, 266 and the planetary gear members are held against further axial movement and the support ring members are held against further rotation which precludes any further revolving movement of the planetary gear members relative to the sun gear means. The planetary gear members are then rotated on the shaft members 258, 260, 261, 262 by the ring gear means and causes rotary movement of the sun gear means in direct proportion to the gear ratio between the internal ring gear means and the sun gear means which may be to 2:1 or whatever gear ratio may be desired. The rotary movement of the sun gear means causes corresponding rotary movement of the rear wheel hub member 20 to which it is affixed. The interlocking arrangement of the holding teeth 288 and 292 and 290 and 294 causes continued engagement therebetween as long as forward motion force is applied to the sprocket wheels 312, 314 by the drive chains and, as soon as the input force terminates, the teeth will be disengaged by axial inward displacement of the planetary gear means due to the helical gear teeth and the self-disengaging construction of the teeth. If necessary or desirable, spring means (not shown) may be between hub members 300, 302 and the carrier ring members 264, 266 in the gap 330 provided to assist the return movement.

Alternative embodiments of the invention may include the use of spline gear teeth on the internal ring gear means, the planetary gear means and the sun gear means with axial outward and inward movement of the planetary gears and support ring means being effected by various conventional one way clutch devices such as shown in FIGS. 1–5 and FIG. 6.

While the illustrative embodiments of the invention are particularly adapted for use in a bicycle drive system, the inventive concepts are also useful for other types of drive systems. Also, the relative axial and rotation movements may be varied as necessary or desireable.

Since the inventive concepts may be adapted for use in various alternative embodiments and may be used in various kinds of drive systems, it is intended that the appended claims be construed to include other embodiments of the invention than the illustrative embodiments hereinbefore described and illustrated except insofar as limited by the prior art.

What is claimed is:

1. A one way rotary force transmission system comprising:
   a rotary force input means for receiving force from operatively associated drive means to impart an angular input velocity thereto;
   a rotary output means for rotation by said rotary force input means in only one direction to impart an angular output velocity thereto;
   rotatable force transmission means having at least one transmission member displaceable relative to said rotary force output means between an input force transfer position of direct positive input force transfer between said transmission means and said rotary force output means and a non-force transfer position preventing transfer of force between said rotary output means and said rotary force input means; and
   transmission actuating means operatively associated with said one transmission member of said transmission means for causing displacement thereof to the input force transmission position in response to applied force causing an angular input velocity greater than the angular output velocity of said rotary output means and to the non-force transfer position in response to reduction in angular input velocity of said rotary force input means below the angular velocity of said rotary output means and being in substantially non-force transfer and in non-load bearing relationship with said rotatable force transmission means and said rotary output means in the input force transfer position.

2. The invention as defined in claim 1 and wherein said rotatable force transmission means comprise:

force transfer coupling means, including a drive coupling means operatively associated with said rotatable force transmission means and a driven coupling means operatively associated with said rotary force output means, being engageable in the input force transfer position for operatively connecting said rotary force input means relative to said rotary force output means and being disengageable in the non-force transfer position for operatively disconnecting said rotary force input means relative to said rotary force output means.

3. The invention as defined in claim 2 and wherein said transmission actuating means comprise:
a one-way clutch means operatively associated with said one transmission member for causing displacement of said one transmission element between said input force transfer position and said non-force transfer position in response to changes in relative angular velocity between said rotary force input means and said rotary force output means.

4. The invention as defined in claim 3 and wherein said force transfer coupling means comprising:
self-engaging and disengaging teeth means on said drive coupling means and said driven coupling means for causing and continuing engagement thereof wherever angular velocity of said rotary force input means exceeds the angular velocity of said rotary force output means and for causing disengagement thereof whenever the angular velocity of said rotary force input means is less than the angular velocity of said rotary output means.

5. The invention as defined in claim 4 and further comprising:
spring means effective between said rotary force output means and said rotary force input means for biasing said coupling means toward the non-force transfer position.

6. The invention as defined in claim 3 and wherein:
said rotary force output means comprising a bicycle wheel assembly;
wheel axle means for rotatably supporting said bicycle wheel assembly and providing a central axis of rotation therefor;
said transmission element comprising a sleeve member mounted in coaxial relationship on said wheel axle means and being rotatable and axially displaceable relative to said bicycle wheel assembly and said wheel axle means; and
said force transfer coupling means comprising a first set of teeth on said wheel assembly and a second set of teeth on said sleeve member.

7. The invention as defined in claim 6 and wherein said rotary force input means comprising a sprocket wheel member fixedly mounted on said sleeve member and being axially and rotatably movable therewith.

8. The invention as defined in claim 7 and wherein said one-way clutch means comprising a plurality of one-way clutch devices operatively associated with said sleeve member to cause axial displacement thereof.

9. The invention as defined in claim 8 and wherein said one-way clutch means further comprising:
a ring member coaxially mounted on said wheel axle means and being rotatable relative thereto;
said plurality of one-way clutch devices being mounted circumjacent and located between said bicycle wheel assembly and said ring member.

10. The invention as defined in claim 9 and wherein said transmission actuating means further comprising:
a plurality of inclined slots in said ring member; each of said slots having a roller member mounted therein; and
each roller member being rotatably mounted on a pin member connected to said sleeve member.

11. The invention as defined in claim 8 and wherein said one-way clutch means further comprising:
an annular slot between said sleeve member and said wheel assembly;
said one-way clutch devices being sprag members and associated spring members mounted in said annular slot.

12. The invention as defined in claim 1 and wherein said rotary force output means comprising:
a bicycle wheel assembly including a hub portion; and
a wheel axle means for rotatably supporting said hub portion of said bicycle wheel assembly and providing a central axis of rotation therefor; and
said rotary force transmission means comprising:
a sun gear member being rotatably mounted relative to said wheel axle means and drivably connected to said hub portion of said bicycle wheel;
a plurality of planetary gear members being rotatably mounted relative to and drivably engaged with said sun gear member; and
a ring gear member being rotatably mounted relative to and drivably engaged with said planetary gear members and operatively connected to said rotary force input means.

13. The invention as defined in claim 12 and further comprising:
carrier means for rotatably supporting said planetary gear means and being axially displaceable relative to said sun gear member and said ring gear member;
said drive coupling means being operatively connected to said carrier means;
said sun gear member and said ring gear member and said planetary gear members being drivably engaged through spiral teeth means constructed and arranged to cause axial displacement of said carrier means and said planetary gears and said drive coupling means between the input force transfer position and the non-force transfer position.

14. The invention as defined in claim 13 and wherein said rotary force input means comprising:
a sprocket wheel member fixedly mounted on said ring gear member and being rotatable therewith.

15. The invention as defined in claim 14 and wherein there being two one-way rotary force transmission systems operably associated with said bicycle wheel assembly.

16. The invention as defined in claim 6 and wherein there being two one-way rotary force transmission systems operably associated with said bicycle wheel assembly.

* * * * *